(12) United States Patent  
McKinney, Jr. et al.

(10) Patent No.: US 6,594,551 B2
(45) Date of Patent: Jul. 15, 2003

(54) ROBOT FOR EXPRESSING MOODS

(75) Inventors: Edward C. McKinney, Jr., San Rafael, CA (US); Tristan M. Christianson, San Francisco, CA (US); Shek Fai Lau, Foster City, CA (US)

(73) Assignee: Sharper Image Corporation, San Francisco, CA (US)

( * ) Notice: Subject to any disclaimer, the term of this patent is extended or adjusted under 35 U.S.C. 154(b) by 0 days.

(21) Appl. No.: 10/235,594

(22) Filed: Sep. 5, 2002

(65) Prior Publication Data

US 2003/0004611 A1 Jan. 2, 2003

Related U.S. Application Data

(62) Division of application No. 09/881,420, filed on Jun. 14, 2001, now Pat. No. 6,507,773.

(51) Int. Cl.[7] .......................... G05B 15/00; G05B 19/00
(52) U.S. Cl. ...................... 700/258; 700/215; 700/245; 700/247; 700/248; 700/249; 700/250; 901/47
(58) Field of Search ................................ 700/258, 245, 700/215, 247, 248, 249, 250, 17, 14; 348/139; 351/200, 239, 242, 243, 246; 359/265, 267, 269, 270, 271, 273; 901/47

(56) References Cited

U.S. PATENT DOCUMENTS

| | | | |
|---|---|---|---|
| D251,628 S | 4/1979 | McQuarrie et al. | D21/150 |
| D258,900 S | 4/1981 | Lanusse | D21/150 |
| D262,643 S | 1/1982 | Wong | D21/150 |
| D287,986 S | 1/1987 | Matsui | D21/150 |
| 4,654,659 A | 3/1987 | Kubo | 340/825.76 |
| D293,344 S | 12/1987 | Shiraishi | D21/150 |
| 4,717,364 A | 1/1988 | Furukawa | 446/175 |
| 4,736,826 A | 4/1988 | White et al. | 191/12.2 A |
| D297,749 S | 9/1988 | Rodis-Jamero | |
| D437,368 S | 2/2001 | Tsai | D21/637 |
| 6,243,623 B1 | 6/2001 | Takenaka et al. | 700/245 |
| 6,266,576 B1 | 7/2001 | Okada et al. | 700/245 |
| 6,289,265 B1 | 9/2001 | Takenaka et al. | 700/245 |
| 6,317,652 B1 | 11/2001 | Osada | 700/245 |
| 6,374,157 B1 | 4/2002 | Takamura | 700/245 |
| 6,415,203 B1 | 7/2002 | Inoue et al. | 700/245 |
| 6,483,536 B2 * | 11/2002 | Aoyama | 348/139 |
| 6,505,098 B1 * | 1/2003 | Sakamoto et al. | 700/245 |
| 6,519,506 B2 | 2/2003 | Osawa | 700/245 |
| 6,522,329 B1 | 2/2003 | Ihara et al. | 345/441 |
| 2001/0047226 A1 | 11/2001 | Saijo et al. | |

OTHER PUBLICATIONS

Thrun et al., Probabilistic algorithms and the interactive museum tour–guide robot minerva, 2000, Internet, pp. 1–35.*

Pogue, Looking at Aibo, the robot dog, 2001, Internet, pp. 1–6.*

(List continued on next page.)

Primary Examiner—William A Cuchlinski, Jr.
Assistant Examiner—McDieunel Marc
(74) Attorney, Agent, or Firm—Fliesler, Dubb, Meyer & Lovejoy LLP

(57) ABSTRACT

A robot which incorporates a body, arms with a hand grip, legs, several sensors, light elements, an audio system, and a video system. The sensors allows the robot to interact with objects in the room, and prevents the robot from traveling off an edge or bumping into obstacles. The light elements allow the robot to express moods. The audio system allows the robot to detect and transmit sounds. The video system allows a user to remotely view the area in front of the robot. Additionally, the robot may operate in a plurality of modes, including modes that allow the robot to operate autonomously. The robot may operate autonomously in an automatic mode, a security mode, a greet mode, and a monitor mode. Further, the robot is manipulated remotely.

23 Claims, 17 Drawing Sheets

OTHER PUBLICATIONS

McDonley, I sense, therefore I feel moody, 1999, Internet, pp. 1–4.*

Yoshihiro Kuroki, "A Small Biped Entertainment Robot," 2001 International Symposium on Micromechatronics and Human Science 0–7803–7190–9/01 ©2001 IEEE.

B. Mohamed, F. Gravez, F.B. Ouezdou, "Emulation of the Human Torso Dynamic Effects During Walking Gait," IEEE International Workshop on Robot and Human Interactive Communication 0–7803–7222–0/01 ©2001 IEEE.

P. Sardain and G. Bessonnet, "Gait Analysis of a Human Walker wearing Robot Feet as Shoes," Proceedings of the 2001 IEEE International Conference on Robotics & Automation, Seoul, Korea, May 21–26, 2001, 0–7803–6475–9/01©2001 IEEE.

Hiroshi Ishiguro, Tetsuo Ono, Michita Imai, Takeshi Maeda, Takayuki Kanda, Ryohei Nakatsu, "Robovie: A robot generates episode chains in our daily life," Proceedings of the $32^{nd}$ ISR (International Symposium on Robotics), Apr. 19–21 2001.

Lim et al., Waseda biped humanoid robots realizing human–like motion, 2000, IEEE, pp. 525–530.*

"Introducing the iRobot–LE™", iRobot Corporation: The i–Robot–LE, http://www.irobot.com/ir/index.htm, downloaded Dec. 5, 2000, 1 page.

"Here are just a few of the uses of the iRobot–LE™," iRobot Corporation: The iRobot–LE:Many Uses, http://www.irobot.com/ir/iR_many_uses.htm, download Dec. 5, 2000, 2 pages.

"The Package", iRobot Corporation: The iRobot–LE: The Package, http://www.irobot.com/ir/iR_package.htm, downloaded Dec. 5, 2000, 2 pages.

"The Power to Transport Yourself Anywhere in the World", iRobot Corporation: The iRobot–LE: Take Control, http://www.irobot.com/ir/iR_take_control.htm, downloaded Dec. 5, 2000, 2 pages.

"All You Need is a High Speed Internet Connection", iRobot Corporation: The iRobot–LE: Requirements, http://www.irobot.com/ir/iR_requirements.htm, downloaded Dec. 5, 2000, 2 pages.

"Questions and Answers About the iRobot–LE™", iRobot Corporation: The iRobot–LE: Questions and Answers, http://www.irobot.com/ir/qa.htm, downloaded Dec. 5, 2000, 6 pages.

"iRobot–LE™ Technical Specifications", iRobot Corporation: The iRobot–LE: Technical Specifications, http://www.irobot.com/ir/tech.htm, downloaded Dec. 5, 2000, 2 pages.

Hamilton, Anita,"Robots Take Over Toyland", Time for Kids, Feb. 23, 2001, p. 7.

Goldman, Lee,"Keeping Up With the Jetsons," Forbes, Oct. 16, 2000, 1 page (p. 248).

* cited by examiner

ROBOT FOR EXPRESSING MOODS

REFERENCE TO RELATED APPLICATION

This application is a divisional of, and claims priority to, U.S. patent application Ser. No. 09/881,420, filed Jun. 14, 2001, entitled "Multi-Function Robot with Remote and Video System", Now U.S. Pat. No. 6,507,773 as of Jan. 14, 2003.

FIELD OF THE INVENTION

The present invention relates generally to a robot that can be manipulated remotely by a user or operate autonomously. More particularly, the robot can detect and avoid bumping into obstacles and traveling off an edge, thus allowing the robot to interact with objects in a room. Further, the robot can be manipulated remotely without the user requiring a line-of-sight with the robot. All of these features allow the robot to provide various security measures.

BACKGROUND

Remote controlled robots allow users to manipulate the robot using a remote control device, allowing the user to move the robot and perform simple tasks. Typically, to be able to see where the user is moving the robot, the user must have a line of sight with the robot. Otherwise, the user cannot see where the robot is and risks damage to the robot by driving it off an edge or colliding with an object.

Therefore, there is a need for a remote control device to have a video screen allowing the user to see the area in front of the robot. With a video screen on the remote control device, a user can move the robot in areas that are not in the user's line of sight. Thus, the robot can be moved into more areas.

Additionally, a robot traditionally cannot interact with people on its own. The user must typically manipulate every action of the robot. Therefore, there is a need for a robot to operate autonomously and interact with people it encounters. To accomplish this, a robot must have the ability to detect moving and stationary objects in the immediate vicinity. To safely operate autonomously, a robot must also have an edge detection system so as to not travel over an edge and damage itself.

Some robots have video cameras, enabling a user to view the area in front of the robot. However, typically the user may only view the image from the video camera through a computer. Therefore, there is a need for a hand-held remote control device with a video screen that a user can easily transport.

SUMMARY OF THE INVENTION

The present invention is a multi-function robot. The robot can operate autonomously or be manipulated remotely by a remote control device. To interact with people in a room, the robot is designed with two arms, two legs, eyes, a mouth, and a head. The arms can rotate in several positions and further contains a hand-grip device. The handgrip device allows the robot to hold and release objects. The legs of the robot are designed to move the robot throughout a room. The mouth and eyes of the robot allow it to communicate with people in the room and provide emotions.

To operate autonomously the robot has multiple sensors to avoid bumping into obstacles within the room and traveling off an edge. The sensors include infrared devices located on the body of the robot and an edge detection element located in the legs of the robot. The robot also has several modes by which it can operate autonomously. For example, an automatic mode allows the robot to move autonomously throughout the room, detect people within the room, and interact with the people. The robot can also provide security to the household when it is the security mode. In security mode the robot can detect noise and send an alarm signal to the remote control device to alert the user that an object has been detected. The robot can also greet people when in the greet mode. Additionally, the robot may be placed in the monitor mode, which allows a user to remotely view objects in front of the object and hear sounds within the vicinity of the robot. Finally, the robot can be placed in the remote control mode which allows a user to remotely manipulate the robot.

To enhance the operation of the modes described above, the robot can display moods through lighting of its eyes and mouth. Depending on the mode the robot is operating from and the type of speech the robot is making, the eyes will change colors to express a different mood. Further, while the robot is speaking the mouth will display different patterns.

To operate manually, a remote control device is used to manipulate the robot remotely. The remote control device contains all the functions a user will need to manipulate the robot. For example, the remote control device contains a joystick, video display, a microphone, a transmitter/receiver, and several other controls to manipulate the robot. The joystick allows the user to translate motion of the robot in several directions. The video display allows the user to remotely view the area in front of the robot through the video camera on the robot. The user can also transmit his voice to the robot such that his voice is projected from the robot.

DETAILED DESCRIPTION

Figure 1:
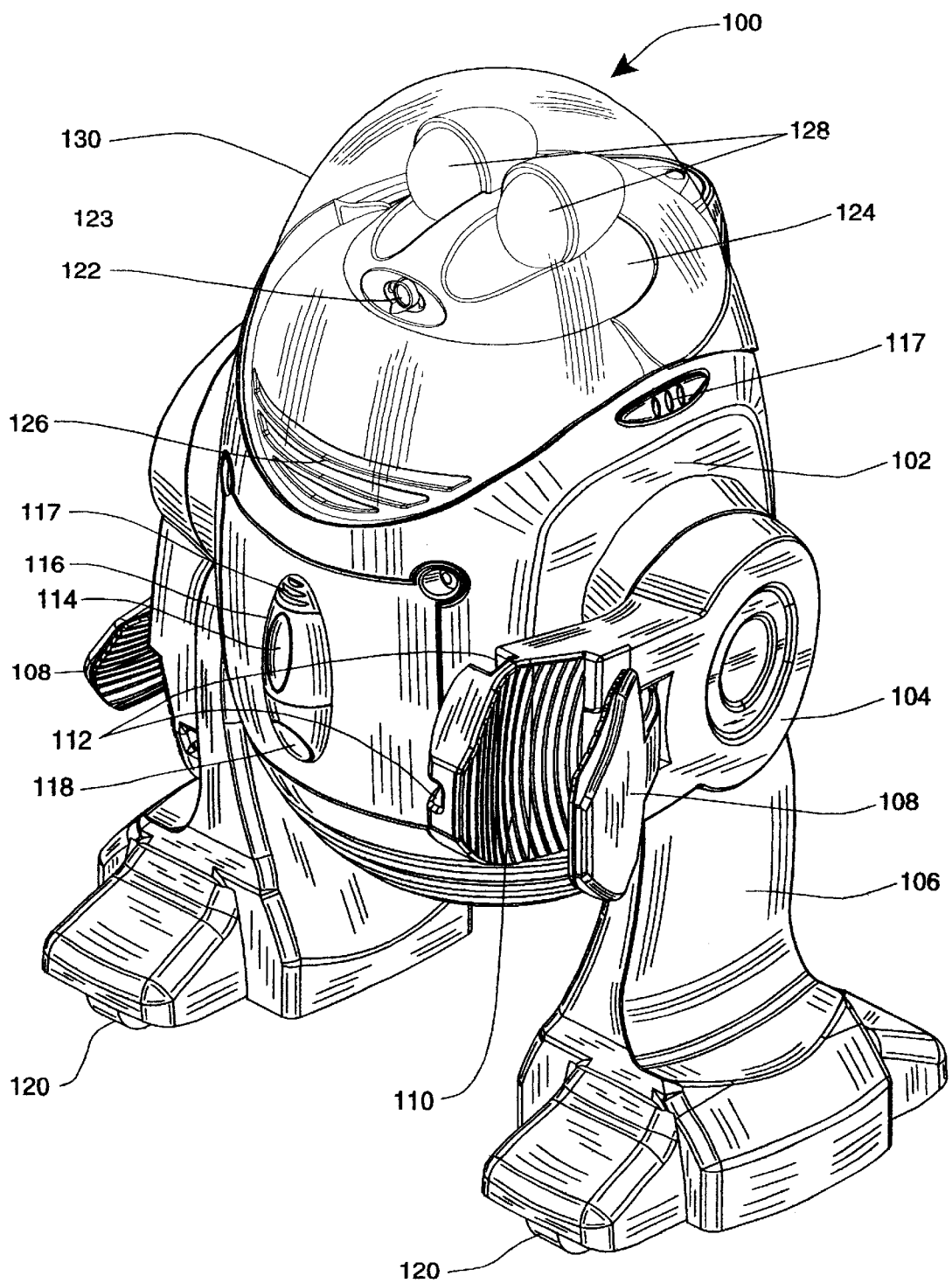
FIG. 1 is a front perspective view of an embodiment of the robot of the invention with the left arm in a raised position and both hands in an open position.

Referring now to FIGS. 1–7, the robot 100 contains a body 102, arms 104, legs 106, video device 122, mouth 126, eyes 128, light 118, microphones 117, active infrared emitter 115, a passive infrared scanner 114, and multiple sensors to assist the robot 100 from running into obstacles or traveling off an edge.

Figure 7:
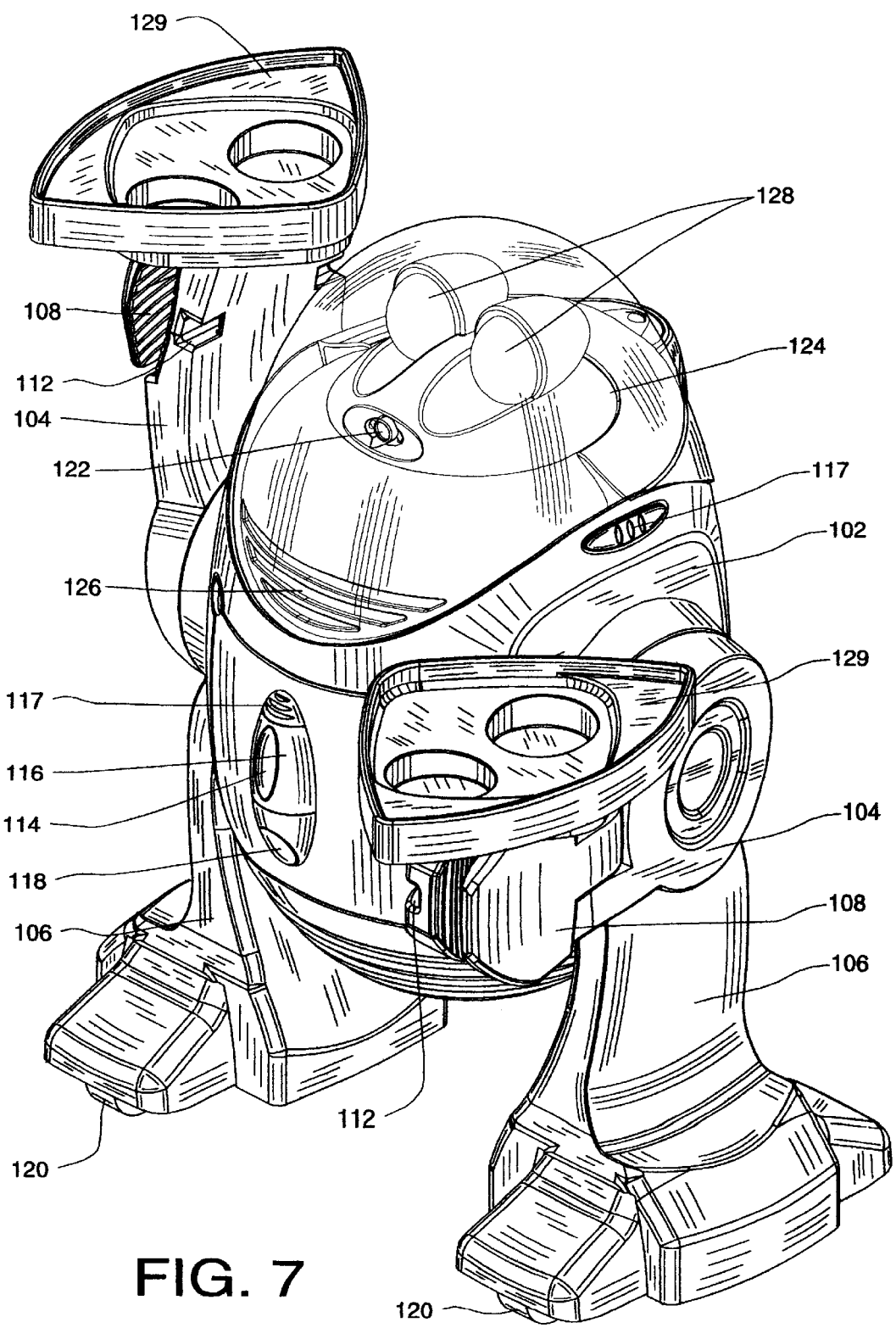
FIG. 7 is a front perspective of the robot thereof with the left arm in a 90° raised position carrying a tray, and the right arm in a 180° raised position carrying a tray.
Figure 9:
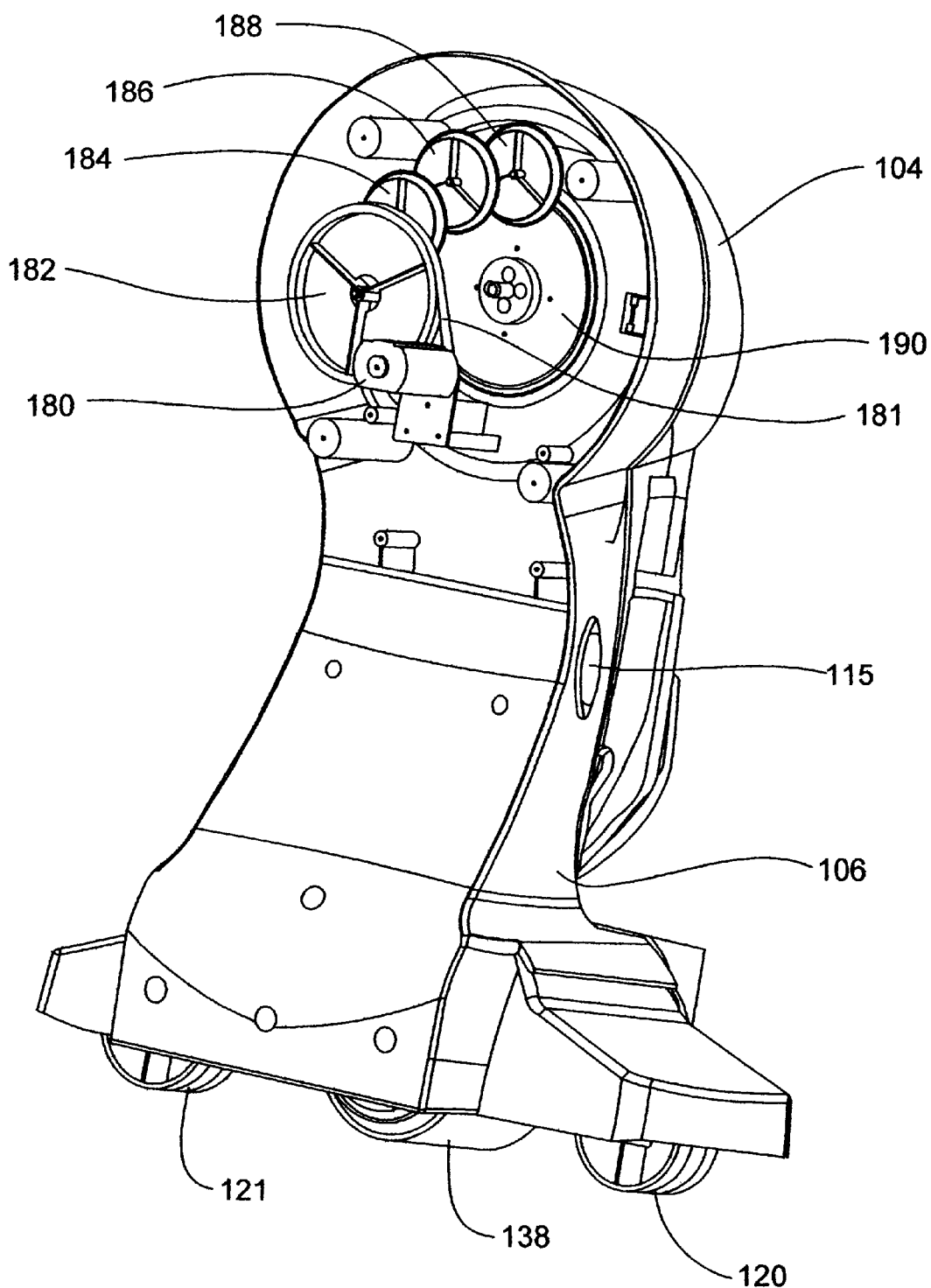
FIG. 9 is a cutaway view of a leg of the robot illustrating the mechanism to rotate the arms.

The arms 104 are connected with the body 102. The arms 104 can be positioned in multiple locations and further can be positioned in pre-set "serving" locations. As shown in FIG. 7, the two pre-set serving positions are at the 90° and 180° positions. Both arms 104 can be adjusted to either position independently. Further, to ensure that the arms 104 will not rotate when in either serving position, the arms 104 can be located so that the remote control 500 cannot activate the arms 104. Referring now to FIG. 9, the mechanism for rotating the arms 104 can be seen. The motor 180, via a flexible belt 181, drives gear 182, which drives gear 184, which drives gear 186, which drives gear 188, which drives gear 190. Gear 190 is attached to the arm 104. To lower the cost and complexity of the mechanism, gears 184, 186, and 188 are the same part. An optical emitter/receiver monitors the movement and location of gear 190 via a toothed wheel (not shown) attached coaxially to gear 190. Such a device is commonly referred to as an optical position encoding device throughout the industry. Therefore, it is known to one of ordinary skill in the art and does not need to be further described. The monitoring through the above described optical position encoding device allows the robot 100 to know the position of the arms 104. When the robot 100 is turned on, the arms 104 are calibrated by moving them through a range of motion that the robot 100 can track their position from the starting position.

To grip and hold an object, the arms 104 also contain a hand grip device. The hand grip device contains a first finger 110 and a second finger 108. As shown in FIG. 1, the first finger 110 is stationary and has cavities 112 for holding a serving device (See FIG. 7). The second finger 108 opens and closes to grip and release an object. However, one of ordinary skill in the art will appreciate that the second finger 108 maybe stationary while the first finger 110 opens and closes. A spring closure mechanism biases the second finger 108 in a closed position. As the mechanism is commonly known to one of ordinary skill in the art, the mechanism does not need to be further described. The spring closure mechanism will not apply more than five pounds of pressure to an object placed between the first finger 110 and the second finger 108. Limiting the pressure to five pounds will prevent damage to an object held between the first finger 110 and the second finger 108.

Figure 8:
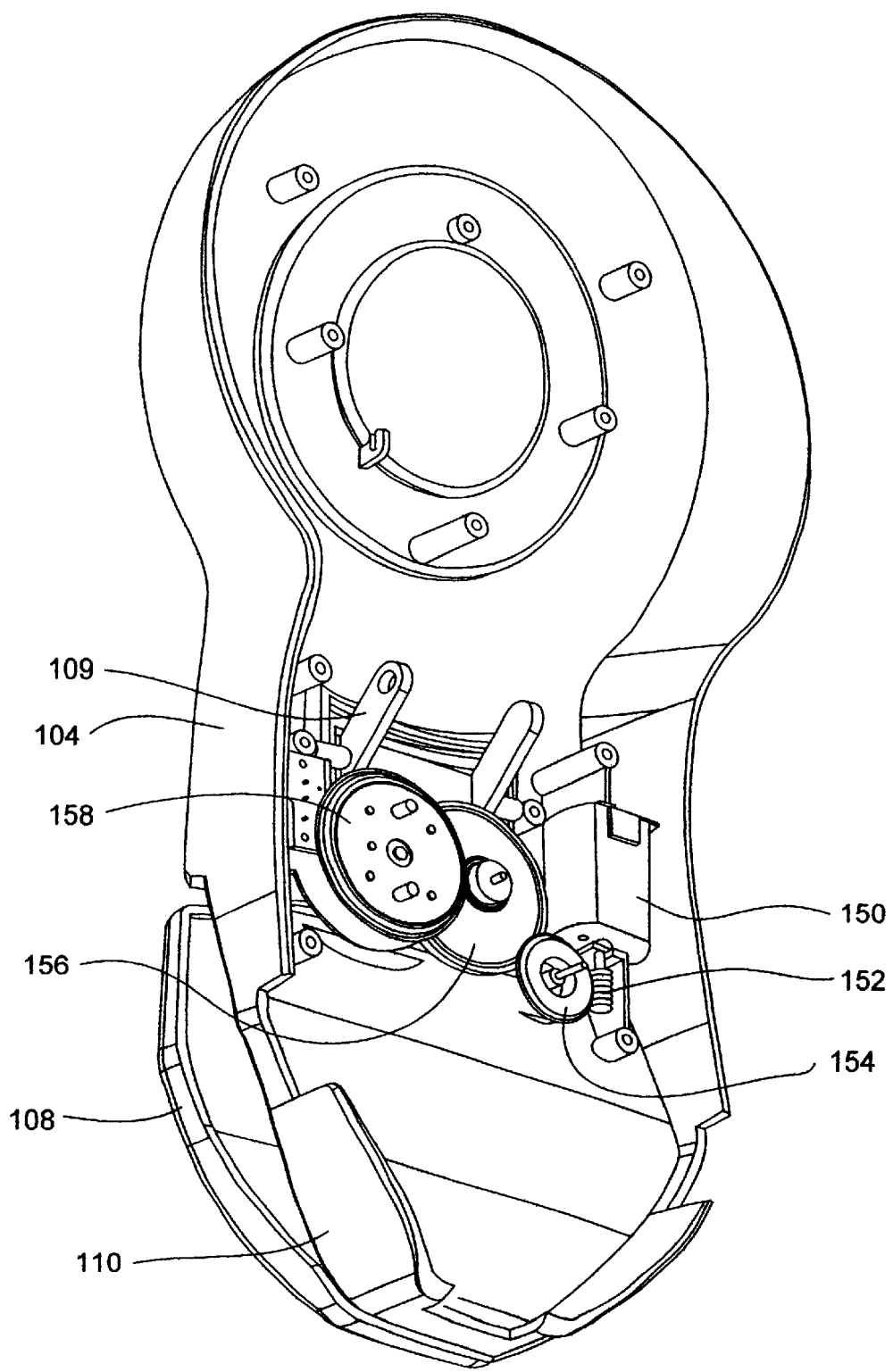
FIG. 8 is a cutaway view of an arm of the robot illustrating the mechanism to open and close the hands of the robot.

A separate motor operates to activate the second finger 108. Referring now to FIG. 8, a leadscrew 152 on the shaft of the motor 150 turns gear 154, which turns gear 156, which turns gear 158. Each stage reduces the RPM and increases torque. The gear 158 has a pin on its underside which pulls a steel linkage which is attached by springs to the lever arms 109 of the second finger 108. As the steel linkage is commonly known to one of ordinary skill in the art, the steel linkage does not need to be further described. This double-spring per can thus be forced open or shut against a spring force without damage to the mechanism.

The legs 106 are also connected with body 102. The legs 106 provide lateral support to keep the body 102 elevated and substantially perpendicular to the ground. The legs 106 also provide the ability for the robot 100 to move about. Each leg 106 contains a drive mechanism 300 to move the robot 100. The drive mechanism 300 located in each leg 106 can move the robot forward, reverse, left and right and both forward and reverse directions, and can spin the robot in place by controlling the rotation of the center wheel 138. Counters on each drive mechanism 300 control the straight forward motion with the two drive mechanisms 300 in synchronization.

Figure 10:
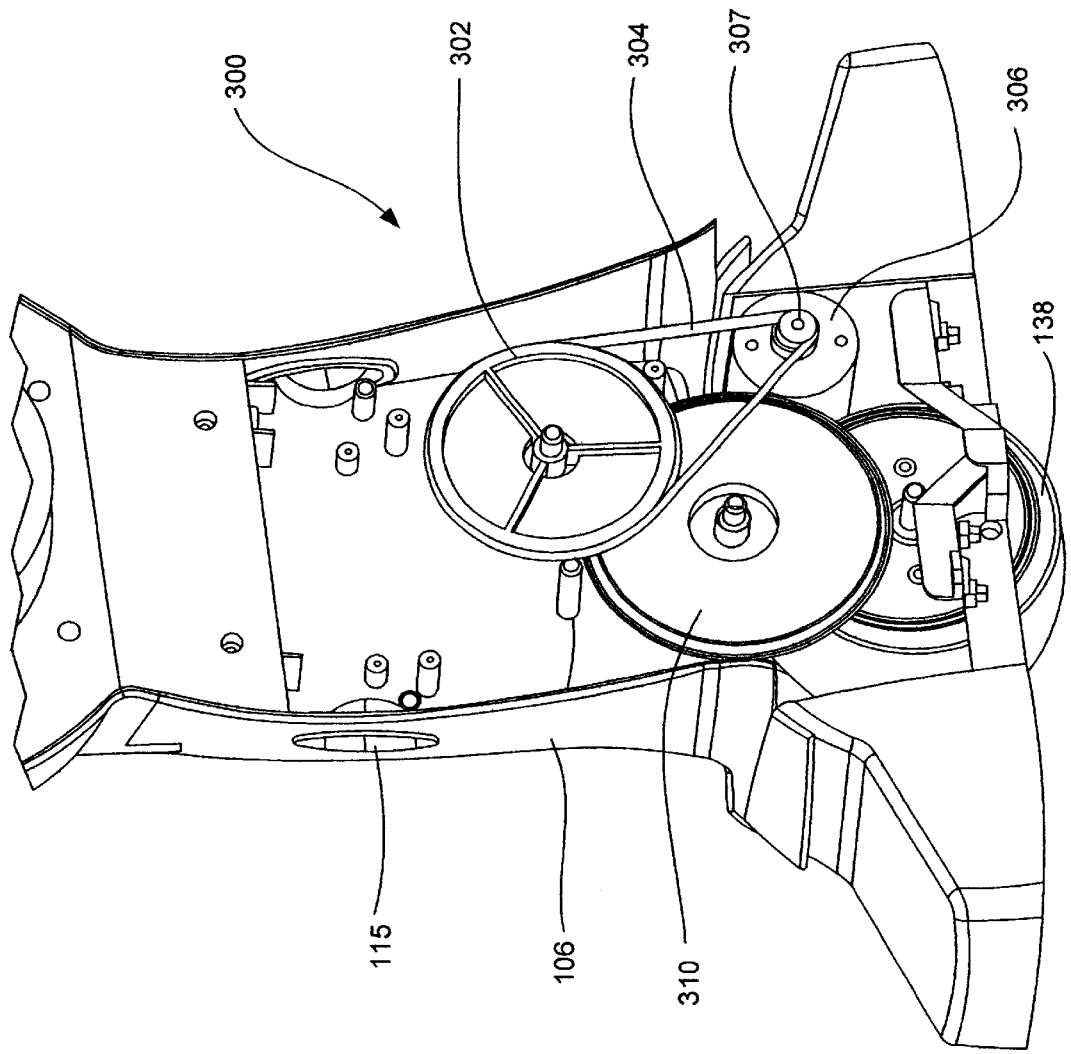
FIG. 10 is a cutaway view of a leg of the robot illustrating the drive mechanism.

The drive mechanism 300 is illustrated in FIG. 10. The motor 306 has an attached pulley 307 to drive the pulley 302 via the flexible belt 304. The pulley 302 has a small gear which also drives the center wheel 138. The small gear is a common toothed wheel which is commonly known to one of ordinary skill in the art. The flexible belt 304 provides tolerance for heavy loads which would otherwise damage a motor or gear train. Also, the flexible belt 304 reduces noise over using hard gears for first-stage reduction. A counter(not shown) mounted on the gear 310 counts the rotation of the center wheel 138 via an attached toothed wheel for indexing and monitoring speed. As the counter is a device which is commonly known to one of ordinary skill in the art, it will not be described further. Other optical position encoding devices can be used with wheel 138 as is known in the art. As the center wheel 138 is the only wheel propelled by the drive mechanism 300, the movement of the robot 100 is dependant solely on the center wheel 138. The front end wheel 120 and rear end wheel 121 rotate freely upon contact with a surface and provide lateral support to keep the body 102 substantially perpendicular with the ground.

The robot 100 has several sensors to prevent the robot 100 from running into obstacles and traveling off an edge. The sensors includes ambient light sensors 123, active infrared emitters 115, passive infrared sensor 114, motor sensors (not shown), a tilt sensor and an edge sensor (not shown but described later). As the motor sensor and the tilt sensor are commonly known to one of ordinary skill in the art, they will not be described herein.

The ambient light sensor 123 determines if the ambient area in front of the robot 100 is below a minimum illumination. If the intensity of the ambient light is not enough to view objects through the video display 504 of the remote control 500 without additional light, an infrared mode of the video device 122 will be activated, allowing a user to see objects at night.

To help the robot 100 avoid bumping into obstacles and traveling off an edge, the robot 100 contains active infrared emitters 115, a passive infrared (PIR) sensor 114 and four edge sensors 107, described hereafter. Avoiding obstacles is an important function of the robot 100 so that the robot 100 can operate autonomously. Each leg 106 contains three active infrared sensors 115. The PIR sensor 114 is located on the front of the body 102. The edge sensors 107 are located in the legs 106, whereby one sensor is located in each toe and heel of the leg 106.

The robot 100 contains six active infrared emitters 115, with three in each leg 106. Signals emitted by the active infrared emitters 115 are detected by signal receiving device located within housing 116. The three active infrared emitters 115 located in each leg 106 emits a signal at a different angle. The pattern is identical in both the legs 106. For example, if the three active infrared emitters 115 are aligned in a vertical pattern, the top emitter would emit a signal in a substantially 90° angle from the surface of leg 106. Additionally, the middle emitter would emit a signal approximately 30° offset towards the ground from the top emitter. The bottom emitter would emit a signal approximately 30° offset towards the ground from the middle emitter. Since each emitter 115 emits a signal at a different angle, the signal will reflect off an object at different places in a room.

This pattern of active infrared emitters 115 allows for each emitter 115 to detect an object at a different distance or time. For example, since the top emitter emits a signal substantially parallel to the ground, the top emitter will indicate that an object is in front of the robot 100, but at a distance far away. As the middle emitter emits a signal toward the floor, the middle emitter will indicate that an obstacle is in front of the robot 100 and closer than if the top emitter would have detected the object. Similarly, as the bottom emitter substantially emits a signal toward the ground, the top or middle emitter may not detect an object very close. Thus, the bottom emitter, by not receiving a signal, will indicate that an object is directly in front of the robot 100 and that the obstacle is very near, such as an edge.

Each active infrared emitter 115 emits a signal. However, only one emitter 115 emits a signal at a time. The six emitters 115 time share the signal receiving device. By only allowing one active infrared emitter 115 to send a signal at a time, the signal receiving device knows which emitter 115 sent the signal. Thus, the robot 100 can determine if the object is far away, near or immediately in front of it. Further, as the emitters 115 continuously emit a signal, the robot 100 can monitor and update the position of objects and edges. With three emitters 115 located on each leg 106, the robot 100 can distinguish if the obstacle or edge is on the left or right side.

The PIR sensor 114 is a separate system from the active infrared emitters 115. The PIR sensor 114 does not emit a signal. Instead, the PIR sensor 114 detects heat. Normally, a passive infrared sensor is not able to detect an object emitting heat if the object is stationary because a typical passive infrared sensor detects a change in temperature. However, the robot 100 can detect a stationary object that emits heat because the PIR sensor 114 is mounted in housing 116, which continuously rotates through a range.

Figure 12:
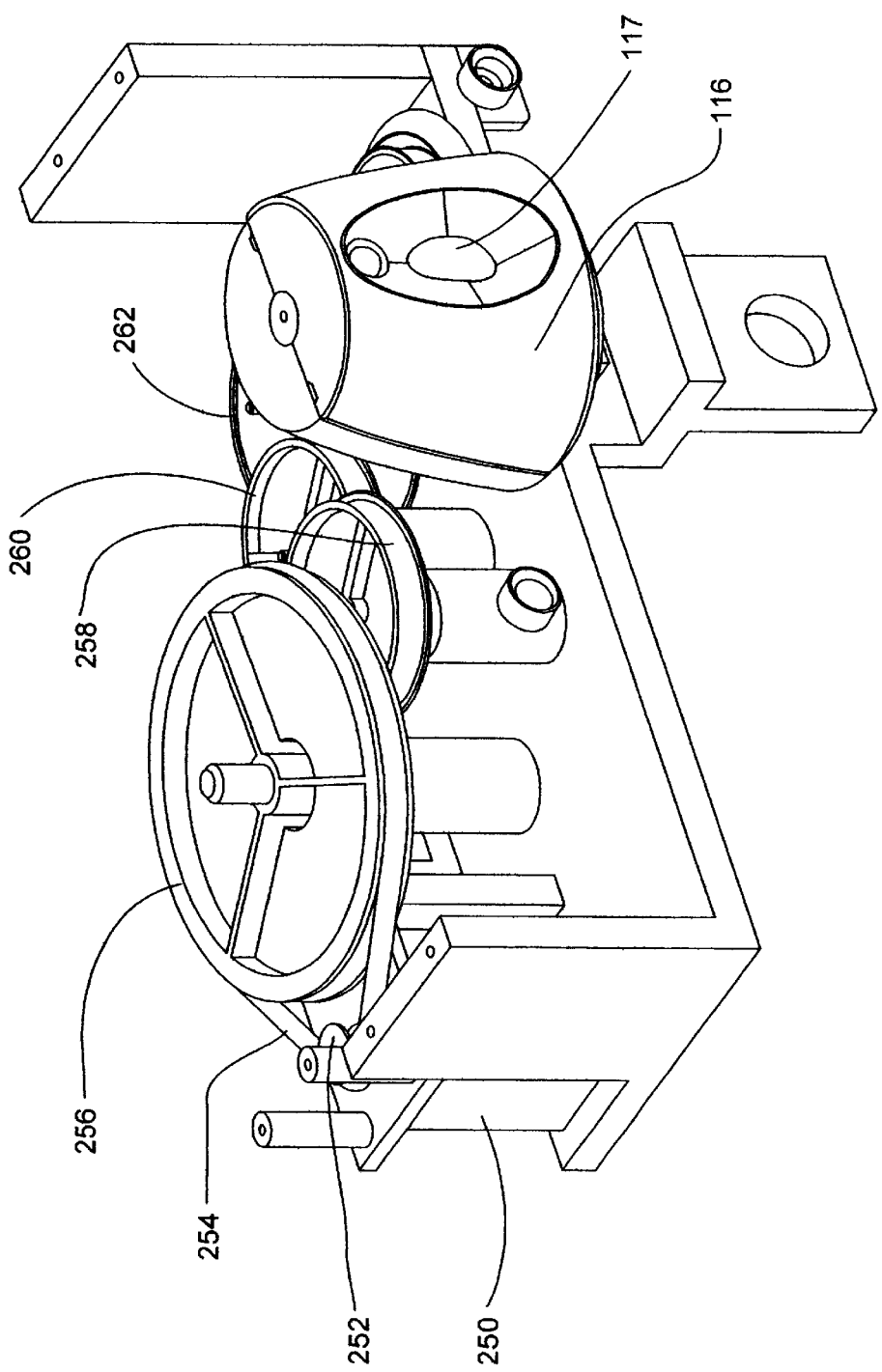
FIG. 12 is a cutaway view of the mechanism to drive the scanning passive infrared sensor.

Referring now to FIG. 12, the motor 250 has an attached pulley 252 to drive the pulley 256 via the flexible belt 254. The pulley 256 drives the pulley 258, which drives the pulley 260, which drives the pulley 262, which drives the housing 116. Similar to the drive mechanism 300, this drive belt provides tolerance for heavy loads and reduces noise over using hard gears. An optical emitter/receiver (not shown and similar to these described above) monitors the movement and location of the gear that drives the housing 116. The PIR sensor 114 will detect heat signals as it moves through the range dictated by the housing 116. For example, as the housing 116 rotates through its range, the temperature differential between the person and the surrounding environment will be detected by the PIR sensor 114. The robot 100 will know the location of the person in relation to the robot 100 by the angle the housing 116 is at the moment the PIR sensor 114 detects the heat differential.

The edge detection system relies on feedback from the active infrared emitters 115, the signal receiving device, and an edge detection element 107 located in leg 106. The active infrared emitters 115 sequentially send out signals as previously described. When the signal receiving device detects an edge from the signal emitted by an active infrared emitter 115, the robot 100 will then slow down, thus allowing the edge detection element 107 in leg 106 to confirm that there is an edge. The edge detection element 107 is a leaf switch 111 connected with the front wheel 120 and the rear wheel 121. As the robot 100 moves slowly forward, if the front wheel 120 or the rear wheel 121 travels a predetermined distance downward, the leaf switch 111 will close and complete a circuit to send a signal to the robot 100 that there is an edge. Thus, the robot 100 will not continue to travel in that direction. Instead, the robot 100 will change direction and continue to operate autonomously. The edge detection element 107 also serves as a backup to the active infrared sensors 115 ability to detect an edge. For example, the signals sent by the active infrared emitters 115 will not reflect from a black carpet. Therefore, the signal receiving device will not detect an edge. In this case, the edge detection element 107 will be the first and only method to detect an edge.

The motor sensors located within the body 102 monitor current surges to the motors to tilt the body 102, rotate the arms 104, rotate the rotating platform 124, and drive the center wheel 138. If a surge in current exceeds a minimum threshold, the robot 100 will notify the user by speaking from its vocabulary (e.g., "ouch," "stop it," "that hurts," "that's heavy," etc.).

Robot 100 has several modes by which the robot 100 can operate. Several modes allow the robot 100 to operate autonomously, while other modes require a user to remotely manipulate the robot 100. The mode settings include a remote control mode, a monitor mode, an automatic mode, a security mode, a greet mode and a demonstration mode.

When the automatic mode is selected, the robot 100 begins to move autonomously throughout the room. As explained above, the active infrared emitters 115 assist the robot 100 to avoid bumping into obstacles and traveling off an edge. While the robot 100 is moving throughout the room it will occasionally speak from the auto vocabulary, depending on sensor input. Simultaneously, the PIR sensor 114 scans the area in front of the robot 100 to detect a heat source. When the robot 100 detects a heat source, the rotatable platform 124 will turn toward the object and speak from its "roam" vocabulary (e.g., "Nice to see you again.", "How are you.", etc.)

Figure 11:
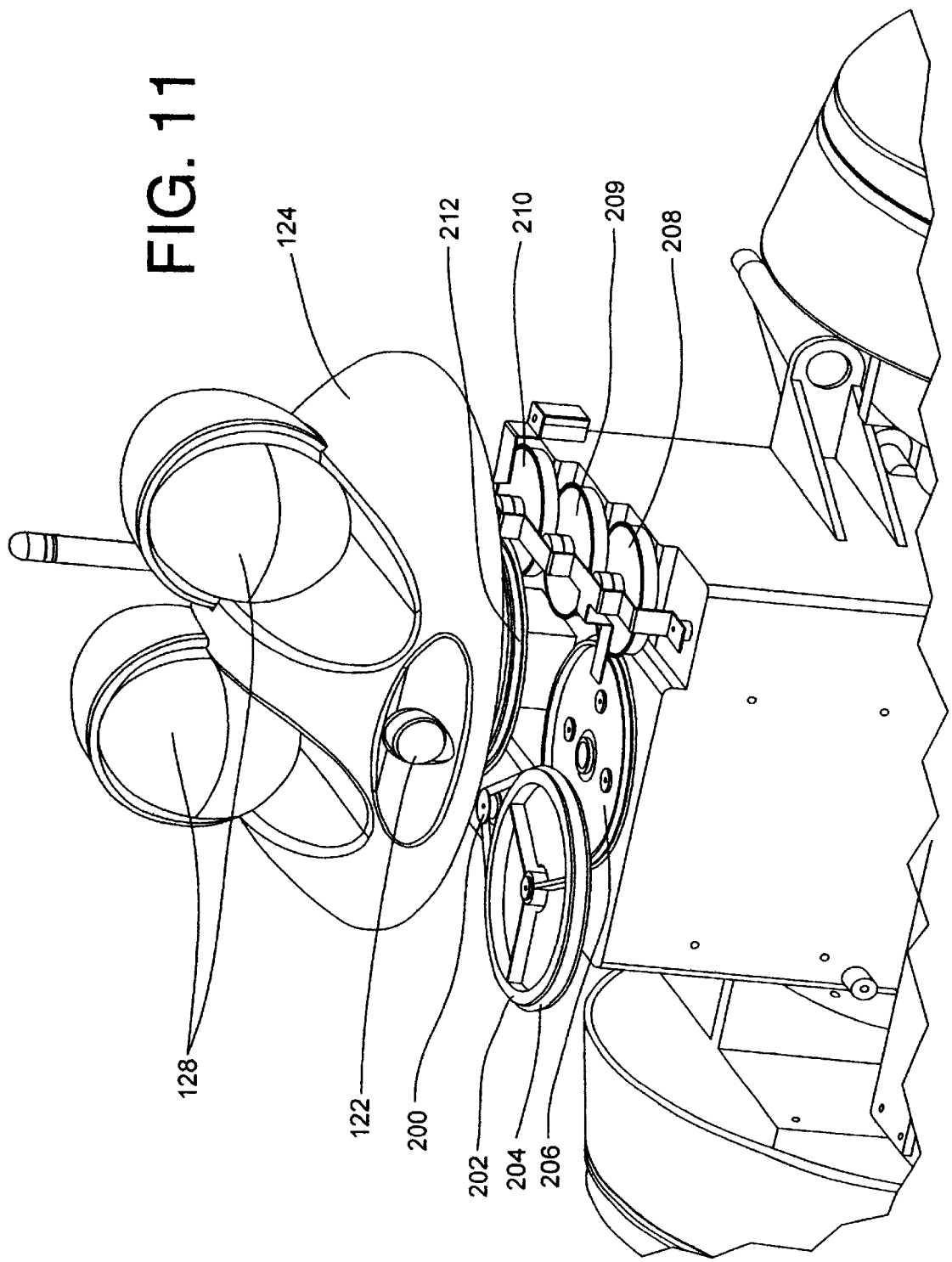
FIG. 11 is a cutaway view of the body of the robot illustrating the mechanism to rotate the rotatable platform.

The motor mechanism which drives the rotatable platform 124 is shown in FIG. 11. A motor has an attached pulley 200 to drive the pulley 202 via flexible belt 204. As the motor is commonly known to one of ordinary skill in the art, the motor will not be described further. The pulley 202 drives the pulley 206, which drives the pulley 208, which drives the pulley 209, which drives the pulley 210, which drives the pulley 212. The pulley 212 drives the rotatable platform 124. The pulleys 208,209 and 210 are the same to lower the cost and complexity of the mechanism. The motor mechanism allows the rotatable platform 124 to rotate either left or right, up to 135°.

The robot 100 can also detect the location of a noise. Three microphones 117 are placed around the robot 100 at approximately 120° angles apart from each other. The microphones 117 can detect the phase difference in a sound detected so that the robot 100 can determine what direction the sound originated from. When a noise is detected, the robot 100 will turn its rotatable platform 124 towards the object as if it is speaking directly to the object.

The robot 100 can also provide security to a household. When the security mode is selected, the robot 100 stands still with minimum power consumption. When the microphones 117 on the robot 100 detect noise above a minimum threshold, the rotatable platform 124 turns towards the noise source and the PIR sensor 114 begins to scan. If a heat source is detected, the robot 100 turns on the light 118, the rotatable platform 124 turns towards the heat source, and the robot 100 makes an announcement from the security vocabulary. Further, the robot sends an alarm signal to the remote control device 500 to alert a user that an object has been detected.

Robot 100 can also greet people. When the greet mode is selected, the robot 100 scans with the PIR sensor 114 to search for a detectable object (e.g., a person). If a heat source is detected, the robot 100 turns the rotatable platform 124 towards the source and makes an announcement from the greeting vocabulary.

Robot 100 can also demonstrate many of its functions through a preprogrammed routine. When the demonstration mode is selected, the robot 100 performs several motions to display various functions that the robot can operate. For example, the robot will rotate its arms 104 through the full range of motion, tilt its body and speak.

The robot 100 can also be manipulated remotely by a user. When the remote control mode is selected, the robot 100 is manipulated remotely by a user via a remote control device 500 (See FIG. 13) or via the Internet.

Finally, when the monitor mode is selected, the drive mechanism 300 is disabled so that the robot cannot move. However, the robot 100 can transmit audio and video signals to the remote control device 500 so that a user can remotely view objects in front of the robot and hear sounds within the vicinity of the robot 100. A user is not limited to the range of remote control device 500 if the user is remotely manipulating the robot 100 via the Internet.

The robot 100 can also display moods to enhance or compliment the specific mode the robot 100 is operating in. The different moods are expressed by the eyes 128 and the mouth 126. The eyes 128 allow the robot 100 to express moods through different combinations of lighting. The eyes 128 contain several lights where each light emits at least one color. The lights may be arranged in several combinations. The combination of lights maybe activated to display at least one color. Specifically, the lights within eyes 128 consist of one blue light, two amber lights and two red lights. The preferred embodiment for the eyes 128 is such that the blue light is positioned in a forward position while the two red and two amber lights are positioned in a rearward position. A reflective surface is placed in the eyes 128 facing the amber and red lights so that the amber and red lights emit light in a forward direction to blend with the blue light. The color emitted from the eyes 128 can be any combination of the blue, amber, and red lights. The combination of lights activated depends on whether the robot 100 is in the night light mode, the monitor mode, the security mode, the remote control mode, the automatic mode or the greet mode.

When the robot 100 is in the night light mode, two amber and two red lights are activated and emitted from the eyes 128. When the robot 100 is in the monitor mode, one amber light is activated and emitted from the eyes 128 at all times. When the robot 100 is in the security mode, the lights activated depend on whether the robot 100 is talking or not talking. When the robot 100 is not talking, one blue light is activated and emitted from the eyes 128. When the robot 100 is talking, one blue light and two red lights are activated and emitted from the eyes 128.

When the robot is the remote mode, automatic mode or greet mode, the lights activated depend on whether the robot 100 is not talking, talking, tired, or tired and talking. When the robot 100 is not talking in either of these modes, one blue light and one amber light are activated and emitted from the eyes 128. When the robot 100 is talking, one blue light and two amber lights are activated and emitted from the eyes 128. When the robot 100 is tired, one blue light and one red light is activated and emitted from the eyes 128. Lastly, when the robot 100 is tired and talking, one blue light and two red lights are activated and emitted from the eyes 128.

To compliment all speech, the robot 100 also has a mouth 126 to express emotions. The mouth 126 consists of several rows of red LED's that can be individually activated. Depending on the sensor input and vocabulary spoken, the robot 100 can demonstrate emotions such as a smile, a frown, puzzled, surprise, concentration and thinking. When the robot 100 is speaking, the LED's continuously change in pattern.

Figure 2:
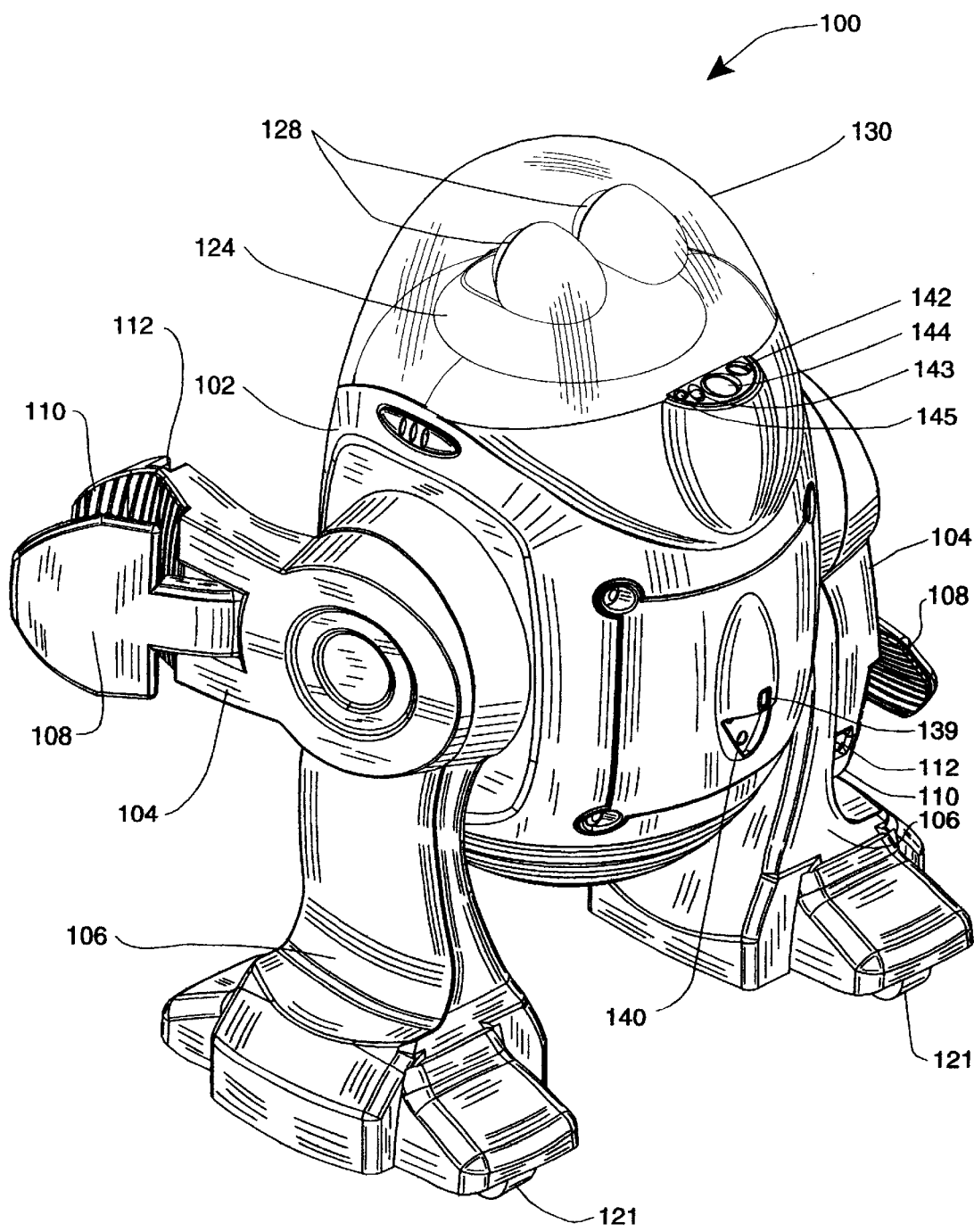
FIG. 2 is a rear perspective view of the robot with the left arm in a raised position and both hands in an open position.
Figure 3:
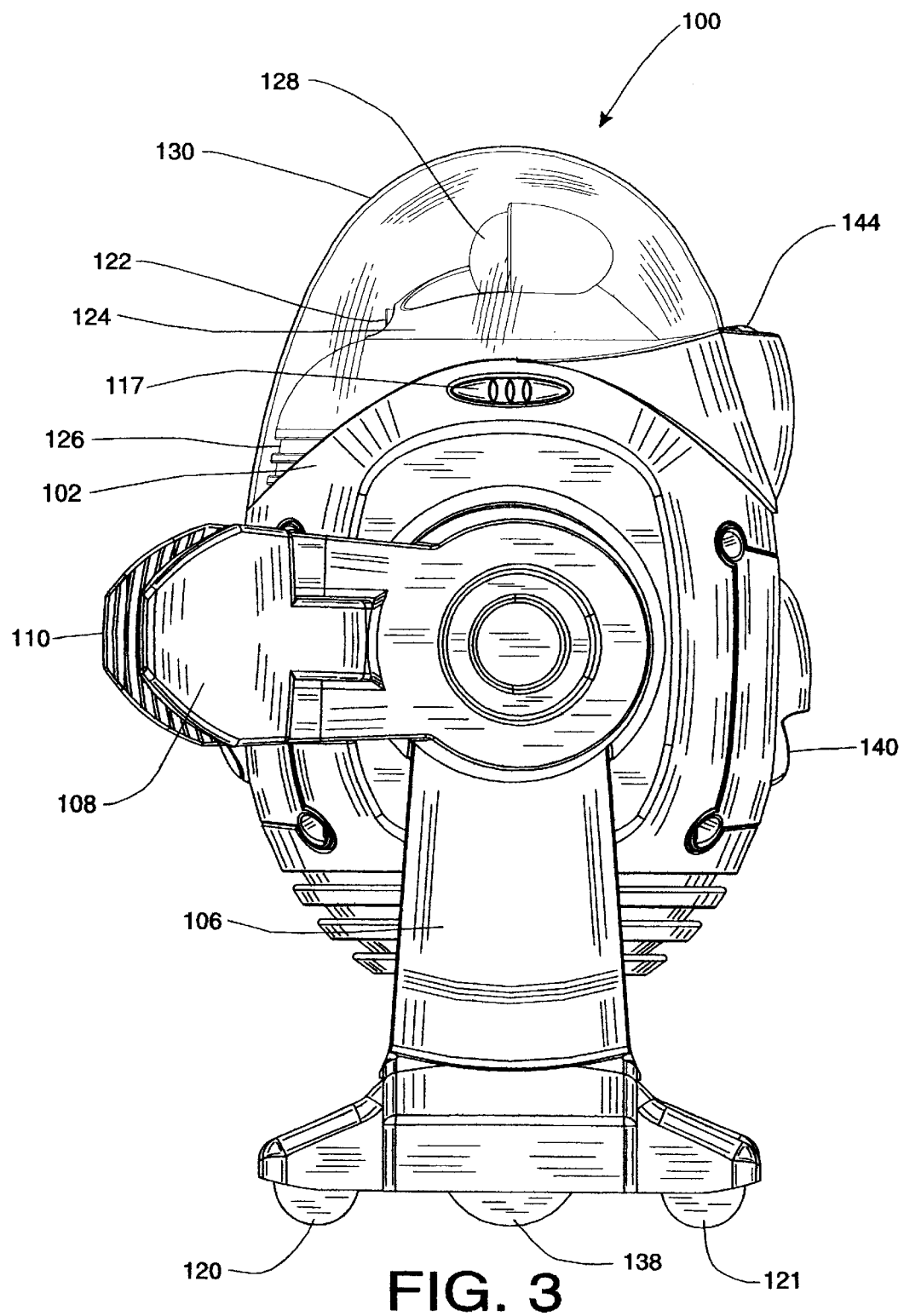
FIG. 3 is a left side view of the robot with the left arm in a raised position and the hand in an open position.
Figure 4:
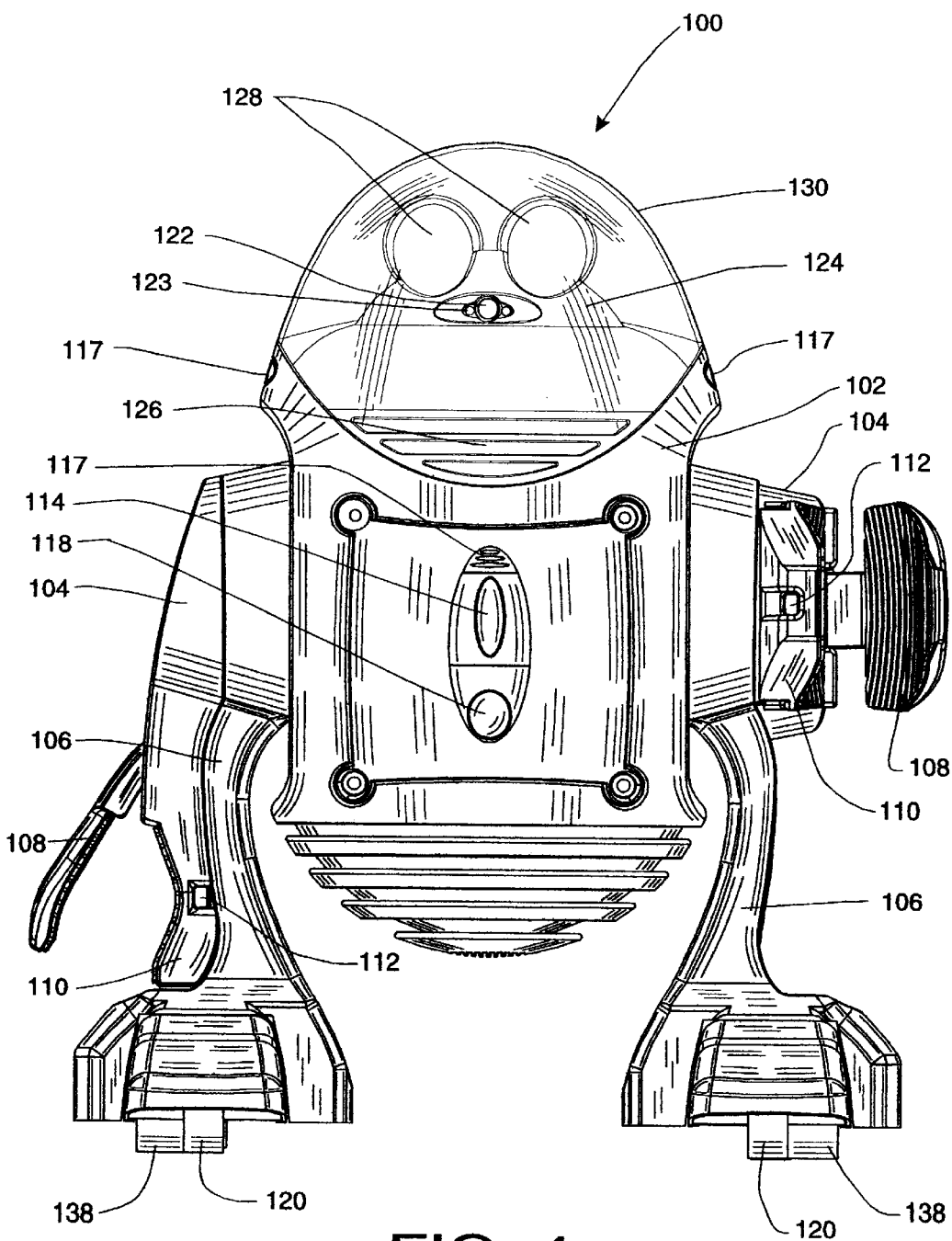
FIG. 4 is a front view of the robot with the left arm in a raised position and both hands in an open position.
Figure 5:
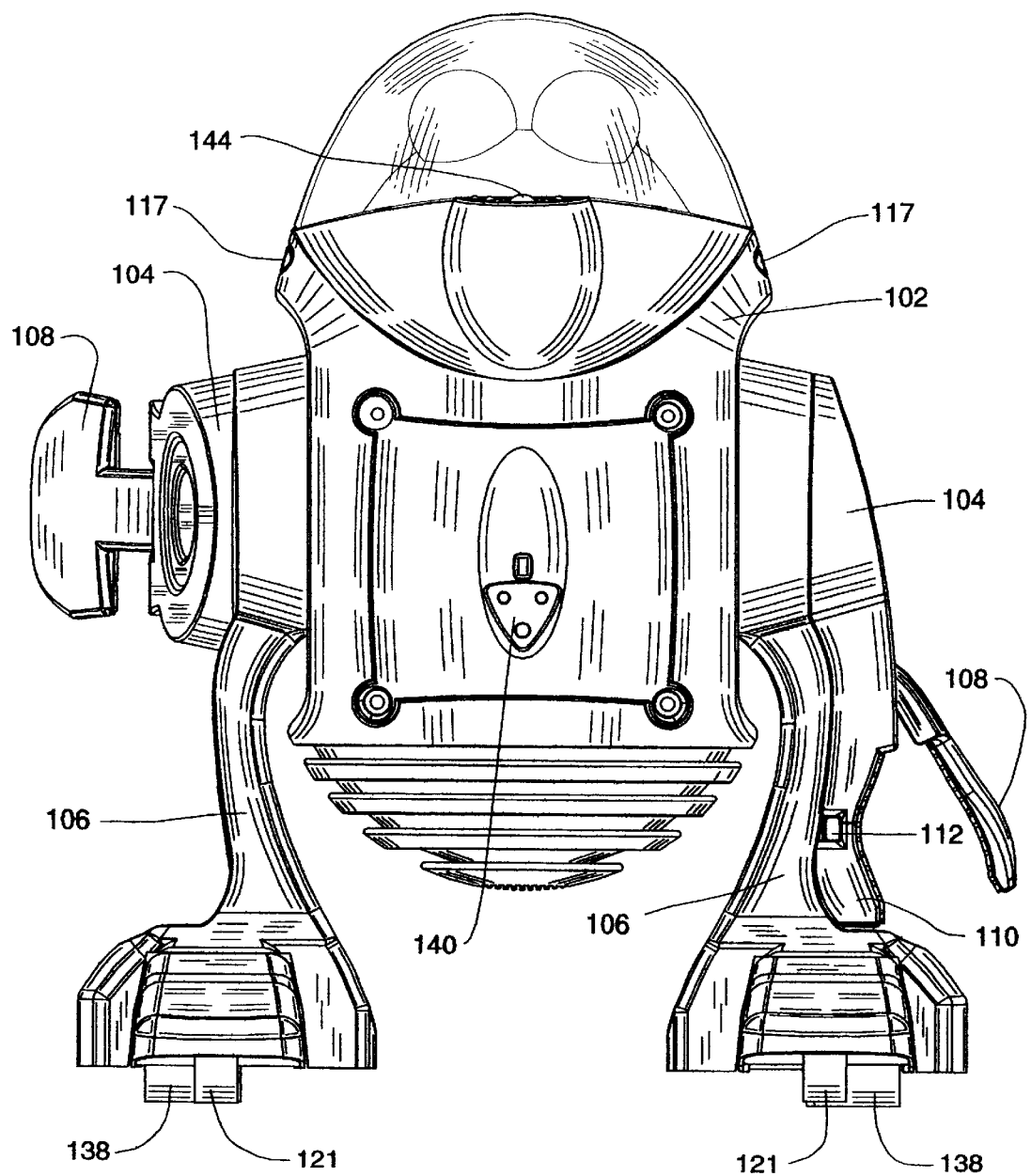
FIG. 5 is a rear view of the robot with the left arm in a raised position and both hands in an open position.
Figure 6:
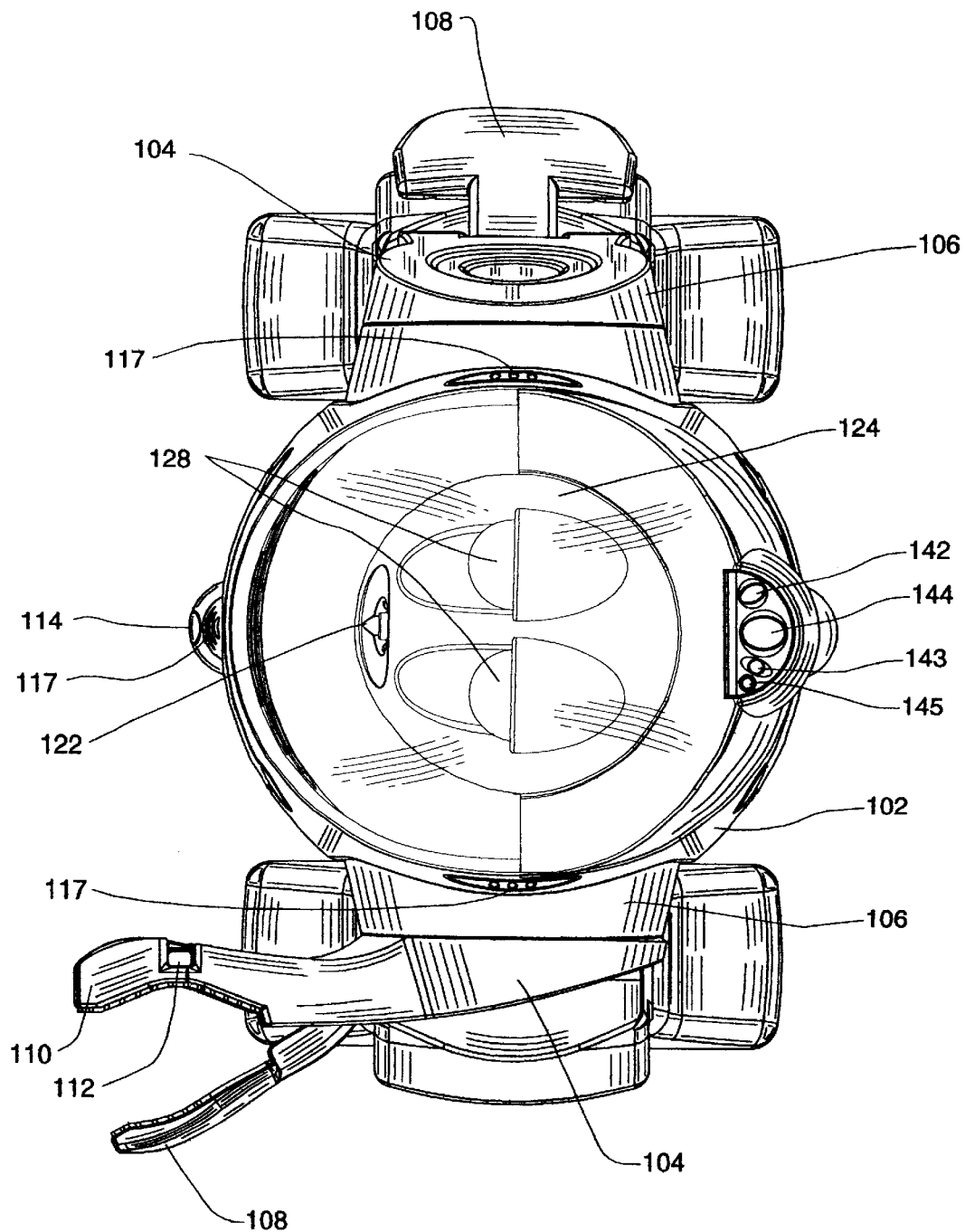
FIG. 6 is a top view of the robot with the left arm in a raised position and both hands in an open position.

Another feature of robot 100 is a low battery indicator 139 (See FIG. 2). The low battery indicator 139 contains five rectangular LED's on the back panel of the robot 100. When the robot 100 is fully charged, all five LED's are lighted. When the power level is down to one lighted LED, the robot 100 has a vocabulary to indicate that the power is low and the robot 100 needs recharging. As the robot 100 detects that the battery becomes discharged, the robot 100 will reduce its functions to preserve power in the following order: first, the video functions; then, the audio functions; then, the locomotion functions will be eliminated. The remote control device 500 also has a low battery circuit which includes an audio power display and power cutoff. The power cut off function is very important as lead-acid batteries will last through many more discharge cycles if they are not fully discharged with each use.

Figure 16:
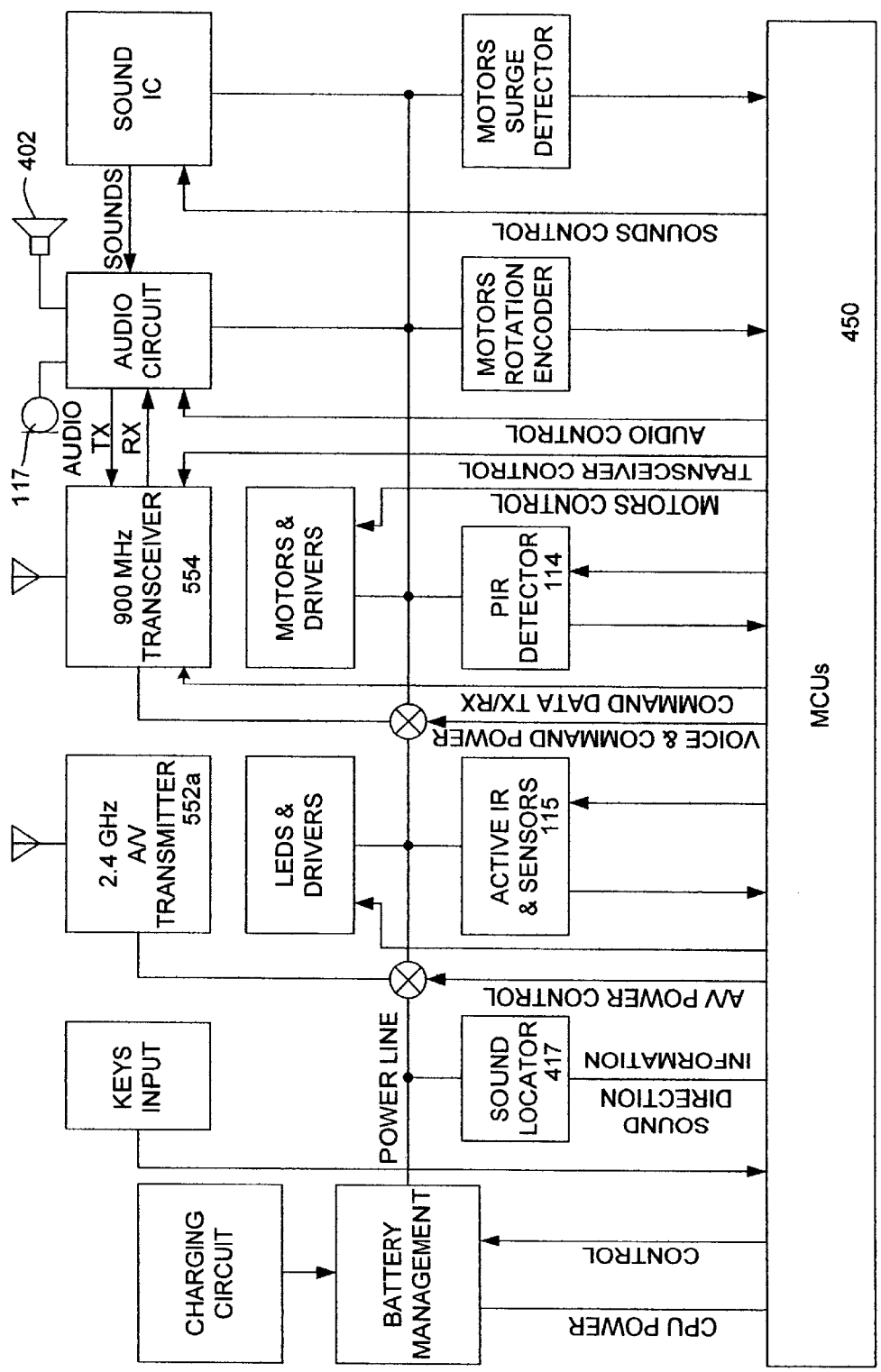
FIG. 16 is a block diagram for the controls of the robot.

The control block diagram for the robot 100 is shown in FIG. 16. As shown, there are several microcontroller units (MCU) 400 that coordinate all the functions of the robot 100. The MCU 400 consists of several, independent integrated circuits to control different functions of the robot. As explained above and illustrated by FIG. 16, the active infrared emitters 115 and the PIR sensor 114 are independantantly controlled.

Figure 13:
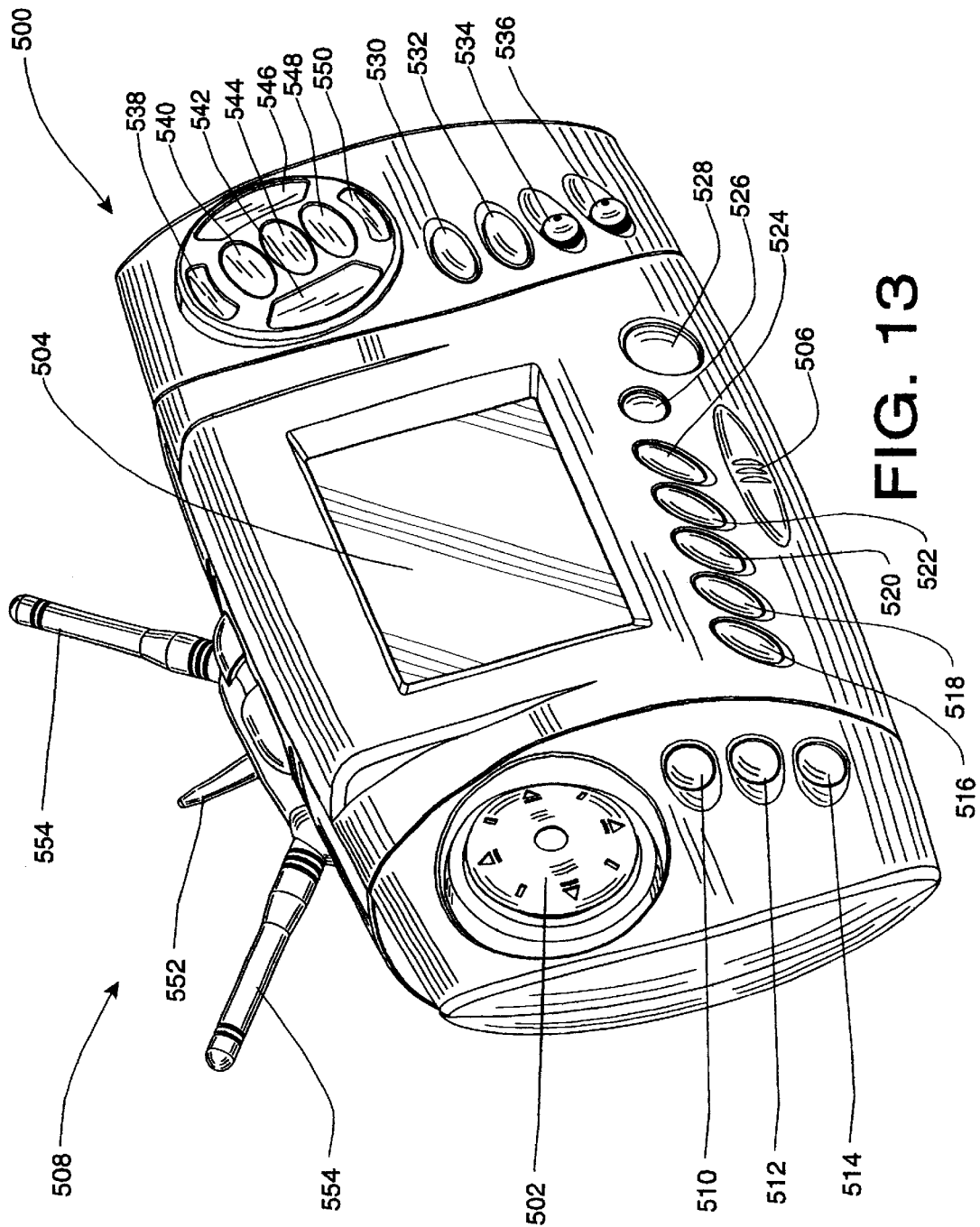
FIG. 13 is a perspective view of an embodiment of the remote control device of the invention.
Figure 14:
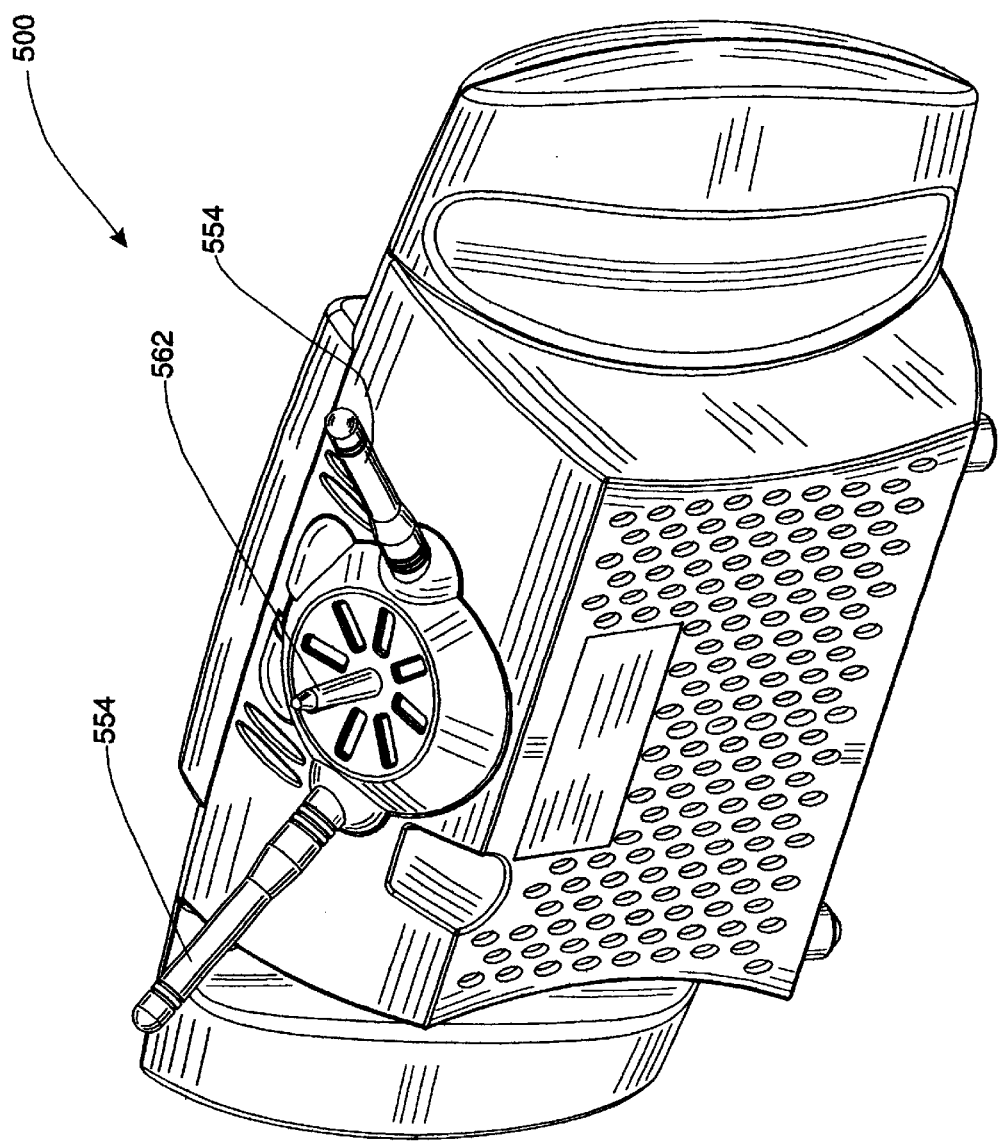
FIG. 14 is a top rear perspective view of the remote control device.
Figure 15:
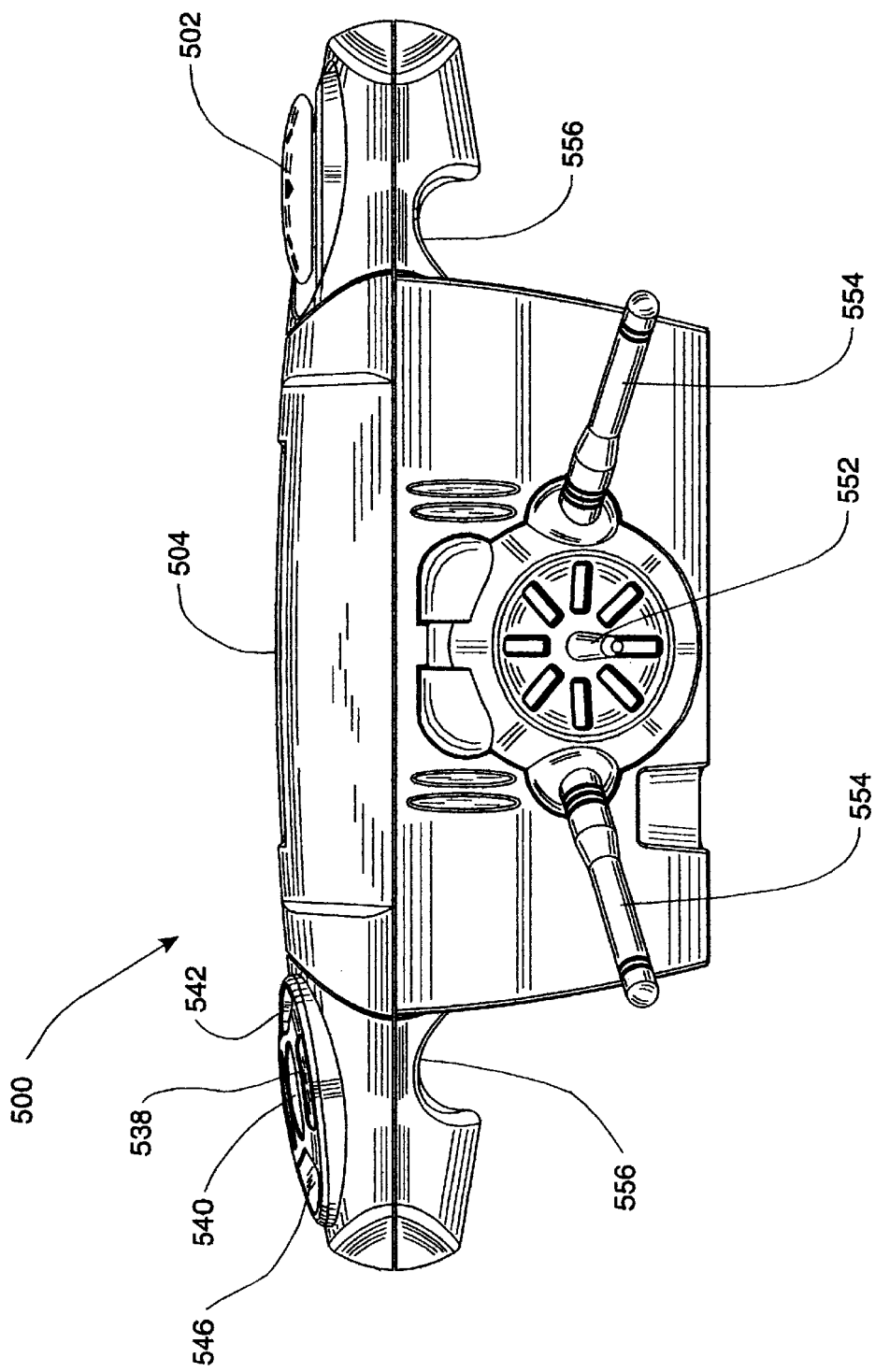
FIG. 15 is a top view of the remote control device.

Referring now to FIG. 13, the remote control device 500 is used to manipulate the robot 100 remotely. The remote control device 500 is a separately powered device from the robot 100. An on/off button 328 may be depressed to turn the remote control device 500 on and off. The remote control device 500 contains a joystick 502, video display 504, a microphone 506, a transmitter/receiver 508 and several controls by which a user can manipulate the robot (which will be disclosed later in this application). The joystick 502 is at a height suitable for use with the single thumb of a user. The joystick 502 has eight compass points to translate motion of the robot 100. The eight compass points include left forward, straight forward, right forward, spin left, spin right, left backward, straight backward, and right backward. When any forward position of the joystick 502 is engaged for more than three seconds the robot 100 will increase speed in the direction engaged, limited by a maximum speed.

The video display 504 allows the user to remotely view the area in front of the robot 100. The robot 100 has a video device 122 which is located on the rotatable platform 124. The image transmitted by the video device 122 is displayed in the video display 504. By turning the rotating platform 124 or moving the robot 100 in a different direction, a user may see a different area of the room. The contrast knob 536 helps the user adjust the contrast of the video display 504 to optimize the image displayed. To conserve battery power, the video display 504 may be turned off by depressing the display power button 526. Even though the video display 504 is off the robot 100 can still be manipulated by the remote control 500.

The microphone 506 allows a user to transmit his voice to the robot 100 so that the user's voice is projected from the robot 100. The remote control 500 has three voice input buttons 510, 512 and 514. By depressing and holding down any of the voice input buttons, a user may speak into the microphone 506 and the voice will be transmitted to the robot 100. The voice input button 510 allows the user's voice to be transmitted to the robot 100. The voice input buttons 512 and 514 activate and audio circuit which distorts the user's voice before it is transmitted to the robot 100. Thus, the user's voice projected from the robot 100 is disguised. The voice input buttons 512 and 514 distorts the user's voice in a different manner. In addition to transmitting your voice to the robot 100, the remote control 500 can receive sounds detected by the robot 100. The microphones 117 on the robot 100 detect surrounding noise and transmit it back to the remote control 500 so that a user may hear them. The volume control knob 534 allows the user to turn the volume of the noise up or down.

The transmitter/receiver 508 has two antennas. First, a 2.4 GHz antenna 552 sends audio and video signals from the robot 100 to the remote control device 500. The second antenna is a 900 MHz antenna 554 that sends control signals from the remote control device 500 to the robot 100. 900 MHz and 2.4 GHz are common frequencies by which many household devices operate on. To insure that the remote control device 500 will not interfere with other devices in the house (e.g., a cordless phone) each antenna has additional channels which the user may select. Specifically, the 2.4 GHz antenna 552 has two channels and the 900 MHz antenna 554 has three channels a user may select to avoid interfering with other similar devices in the house (each cordless phone).

The robot 100 can perform many functions. Several of the functions include tilting the body 102, rotating the arms 104, griping an object, rotating the rotatable platform 124, and moving the robot 100. The body 102 can tilt 180° forward 30° rearward. Tilting the body 102 forward is accomplished by pressing control button 550. Tilting the body 102 rearward is accomplished by pressing control button 538. By pressing and holding either button, the body 102 will continue to rotate, stopping when the button is released or the body 102 reaches its maximum tilt angle.

The arms 104 can rotate through many positions, including two "serve" positions which are located at the 90° and the 180° positions from rest (See FIG. 7). By depressing briefly the up direction button 540 or the down direction button 548, the arms 104 will increment to the next preset position in the direction indicated. Longer button depressions will control motion of the arms 104 manually, stopping at a position when the button is released. Both the up direction button 540 and the down direction button 548 are divided into a left and right half, whereby the right half controls the right arm 104 and the left half controls the left arm 104. Thus, both arms 104 can be controlled independently of the other.

To grip an object, the second finger element 108 can move to a width opening of approximately 75 millimeters away from the first finger element 110. The second finger element 108 can be opened and closed via the hand control button 544 on the remote control 500. Similar to the direction buttons, by quickly depressing the hand control button 544, the second finger element 108 will move to the next preset position. As the motor 150 that controls the movement of the second finger element 108 only rotates in one direction, the second finger element 108 simply cycles through an open and close position. By holding down the hand control button 544 is also divided into a left and right portion. The left half of the hand control button 544 controls the left hand and the right half of the hand control button 544 controls the right hand grip. Thus, the hand grips can be controlled independently. Thus, holding down the hand control button 544 cycles the second finger element 108 through the entire range of motion. The second finger element 108 is also clutched in both directions.

The serving positions of the arms 104 can be automatically accessed by depressing serving button 530. Each time the serving button 530 is depressed, the following positions of the arms 104 are achieved: First, the right arm 104 rotates to a 90° position. Second, the right arm 104 rotates to a 180° position. Third, the left arm 104 rotates to a 90° position. Fourth, the right arm 104 returns to the 90° position. Fifth, the right arm 104 returns to the 180° position. Sixth, the left arm 104 rotates to the 180° position.

The rotatable platform 124 can also be controlled remotely by depressing the left rotate button 542 and the right rotate button 546. The rotatable platform 124 can rotate approximately 135° in either direction. By intermittingly depressing either the left control button 542 or the right control button 546 the rotatable platform 124 will turn incrementally. If the rotatable platform 124 is not at the center position when the drive control is activated, the rotatable platform 124 will automatically return to the center/forward position. This function allows the user to view where the robot 100 is traveling.

The remote control 500 can also be used to select which mode the robot 100 will operate. When the mode button 516 is selected, the robot 100 enters into the automatic mode. When the mode button 518 is selected, the robot 100 enters the monitor mode. When the mode button 520 is selected, the robot enters the security mode. When the mode button 522 is selected, the robot 100 enters the greet mode. When the mode button 524 is selected, the robot 100 enters the remote control mode. If the robot 100 is operating in an autonomous mode, the user may depress the mode button 524 to end the autonomous mode and then the robot 100 can be controlled again by the remote control device 500.

The remote control device 500 can also activate the light 118. If it is dark withing the room and a user wishes to provide additional light in front of the robot 100, the user may do so by depressing the light button 532. By depressing the light button 532 once, the light 118 is turned on. Depressing the light button 532 a second time activates the bright setting of the light 118. Depressing the light button 532 a third time turns the light 118 off.

Figure 17:
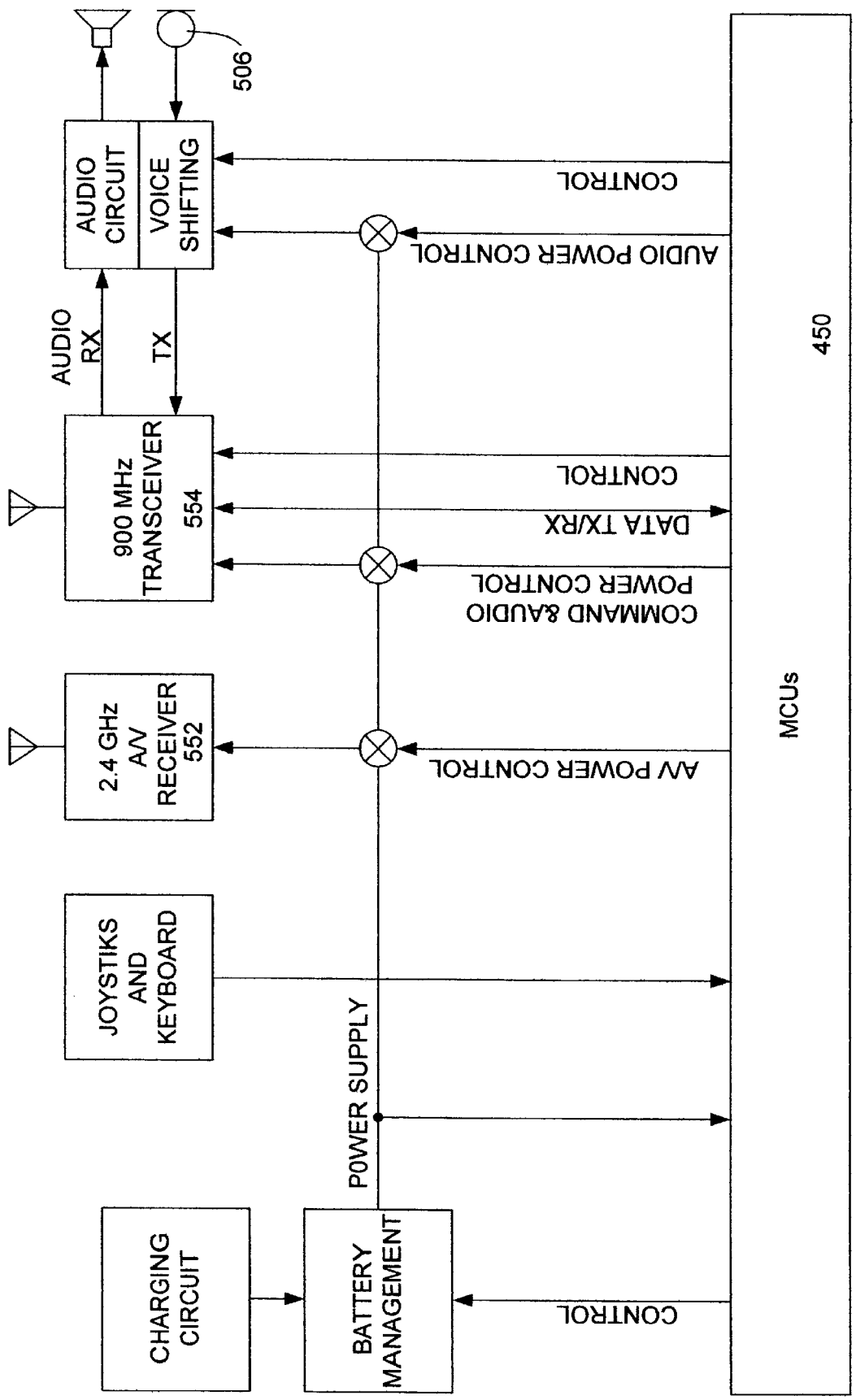
FIG. 17 is a block diagram illustrating the controls fo the remote control device.

Referring now to FIG. 17, a block diagram illustrates the controls of the remote control 500. The microcontroller units (MCU) 450 independently receive signals from the keyboard and joystick. These signals are then sent to the 900 MHz transceiver 554 for transmitting to the robot 100. FIG. 17 also shows that signals received by the microphone 506 are sent to the voice shifting device and then to the 900 MHz transceiver 554 and finally transmitted to the robot 100.

There are several controls which are located on the robot 100 and not on the remote control 500. For example, a user may press and hold the message button 142 located on the back of the robot 100 to record a message for up to fifteen seconds. Once the message is recorded, the message button 142 may be pressed again to hear the recorded message played back. In addition, the find remote button 143 sends an announce signal to the remote control 500 whereby the remote control 500 will make a noise allowing the user find the remote control device 500. The power button 144 is also located on the back of the robot 100. The power button 144 can be pressed to turn the robot 100 on and off. Further, if the user presses and holds the power button 144 for approximately two seconds the robot will enter the demonstration mode.

The foregoing description of preferred embodiments of the present invention has been provided for the purposes of illustration and description. It is not intended to be exhaustive or to limit the invention to the precise forms disclosed. Obviously, many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A robot for expressing moods, the robot including:
   a plurality of light elements;
   a first subset of said light elements directed in a forward direction, said first subset of light elements for emitting light of at least a first color;
   a second subset of said light elements directed in a rearward direction, said second subset of light elements for emitting light of at least a second color, the second color different than the first color; and
   a reflective surface generally facing said second subset of light elements;
   wherein light emitted by said second subset of light elements is directed in the forward direction by said reflective surface;
   wherein various combinations of said plurality of light elements are activated to express moods.

2. The robot according to claim 1, wherein when light is emitted simultaneously by at least one of said first subset of light elements and at least one of said second subset of light elements, the emitted light is combined to produce at least a third color, the third color different than the first and second colors.

3. The robot according to claim 2, wherein:
   said first subset of light elements includes a blue light; and
   said second subset of light elements includes an amber light and a red light.

4. The robot according to claim 3, wherein one of said combinations of said plurality of lights is selected based on a mode of the robot.

5. The robot according to claim 4, wherein one of said combinations is selected depending on whether the robot is in a nightlight mode, a monitor mode, a security mode, a remote mode, a roam mode or a greet mode.

6. The robot according to claim 4, wherein when the robot is in a nightlight mode, said amber light and said red light are activated to emit light.

7. The robot according to claim 6, wherein when the robot is in a monitor mode, said amber light is activated to emit light.

8. The robot according to claim 7, wherein when the robot is in a security mode, said blue light is activated to emit light if the robot is not talking, and said blue light and said red light are both activated to emit light if the robot is talking.

9. The robot according to claim 8, wherein when the robot is in one of a remote mode, an automatic mode and a greet mode, one of said combinations of said plurality of lights is activated depending on whether the robot is talking and/or tired.

10. The robot according to claim 2, wherein:
    said first subset of lights includes a blue light;
    said second subset of light includes two amber lights and two red lights; and
    one of said combinations of said plurality of lights is selected based on a mode of the robot, the robot including at least two of the following modes: a nightlight mode; a monitor mode; a security mode; a remote mode; a roam mode; and a greet mode.

11. A robot for expressing moods and demonstrating emotions, the robot comprising:
    a mouth including a plurality of rows of light elements; and
    a pair of eyes, each said eye including:
       a plurality of further light elements;
       a first subset of said further light elements directed in a forward direction, said first subset of said further light elements capable of producing at least a first color;
       a reflective surface at a rear of said eye; and
       a second subset of said further light elements directed in a rearward direction and generally toward said reflective surface, said second subset of said further light elements capable of producing at least a second color, the second color different than the first color;
    wherein the robot can demonstrate emotions by activating various combinations of said light elements in said plurality of rows of light elements of said mouth;
    wherein the robot can express moods by activating various combinations of said plurality of further lights elements in said pair of eyes.

12. The robot according to claim 11, wherein said plurality of rows of light elements of said mouth comprise a plurality of rows of light emitting diodes (LEDs).

13. The robot according to claim 12, wherein said LEDs continuously change in pattern when the robot is talking.

14. The robot according to claim 13, wherein the emotions that can be demonstrated, by activating various combinations of said LEDs in said plurality of rows of LEDs, include at least two of the following:
    a smile;
    a frown;
    puzzled;
    surprised;
    concentration; and
    thinking.

15. A robot for expressing moods and demonstrating emotions, the robot comprising:
    a mouth including a plurality of rows of light elements; and
    a pair of eyes, each said eye including a respective plurality of further light elements;
    wherein the robot can demonstrate emotions by activating various combinations of said light elements in said plurality of rows of light elements of said mouth;
    wherein the robot can express moods by activating various combinations of said plurality of further lights elements in said pair of eyes.

16. The robot according to claim 15, wherein said plurality of rows of light elements of said mouth comprises a plurality of rows of light emitting diodes (LEDs).

17. The robot according to claim 16, wherein said LEDs continuously change in pattern when the robot is talking.

18. The robot according to claim 17, wherein the emotions that can be demonstrated, by activating various combinations of the LEDs in the plurality of rows of LEDs, include at least two of the following:

a smile;

a frown;

puzzled;

surprise;

concentration; and thinking.

19. The robot according to claim 15, wherein said further light elements of each said eye include a blue light, an amber light and a red light.

20. The robot according to claim 19, further comprising:

a reflective surface within a rear portion of each said eye;

wherein said blue light is directed away from the reflective surface;

wherein said amber light and said red light are directed toward said reflective surface such that light emitted from said amber light and/or said red light is directed in a same direction as light emitted from said blue light; and wherein when light is emitted simultaneously by any combination of said blue, red and amber lights, the emitted light is combined to produce at least one further color.

21. A robot for expressing moods, the robot including:

a plurality of light elements for emitting at least two different colors;

wherein various combinations of said plurality of light elements are activated to express moods;

wherein the moods can be controlled via the Internet.

22. The robot according to claim 21, wherein one of said combinations of said plurality of lights is selected based on a mode of the robot, the mode being selected via the Internet.

23. The robot according to claim 21, wherein:

a first subset of said light elements is directed in a forward direction, said first subset of light elements for emitting light of at least a first color; and a second subset of said light elements is directed in a rearward direction, said second subset of light elements for emitting light of at least a second color, the second color different than the first color;

the robot further comprising a reflective surface generally facing said second subset of light elements;

wherein light emitted by said second subset of light elements is directed in the forward direction by said reflective surface.

* * * * *